No. 681,647. Patented Aug. 27, 1901.
W. H. BAKER & F. E. KIP.
WEFT REPLENISHING AND CONTROLLING MECHANISM FOR LOOMS.
(Application filed June 12, 1901.)
(No Model.) 7 Sheets—Sheet 1.
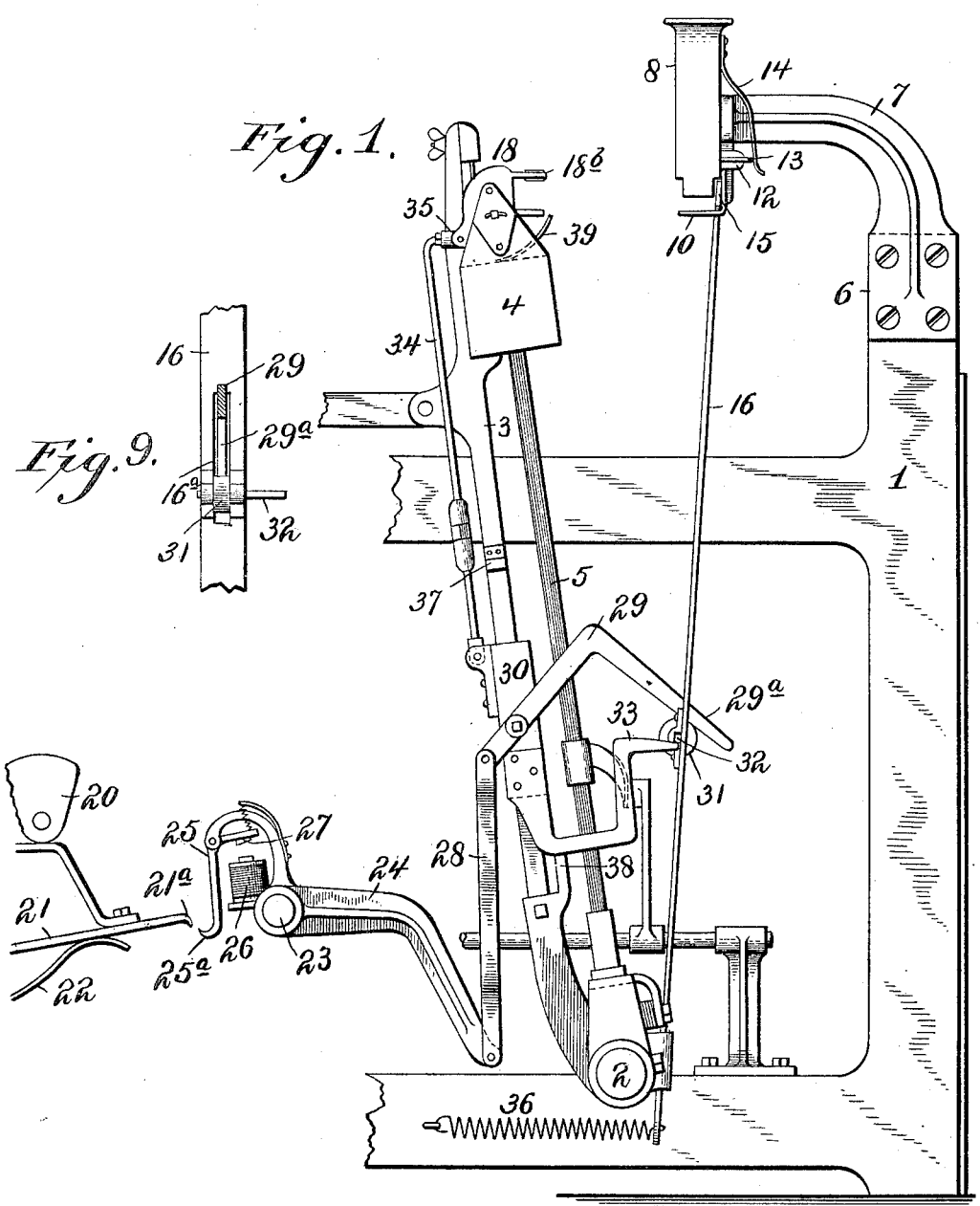
Witnesses:
J. B. McGinn.
F. U. Zlinian
Inventors:
William H. Baker
Frederic E. Kip
by Henry Connett
Attorney No. 681,647. Patented Aug. 27, 1901.
W. H. BAKER & F. E. KIP.
WEFT REPLENISHING AND CONTROLLING MECHANISM FOR LOOMS.
(Application filed June 12, 1901.)
(No Model.) 7 Sheets—Sheet 2.
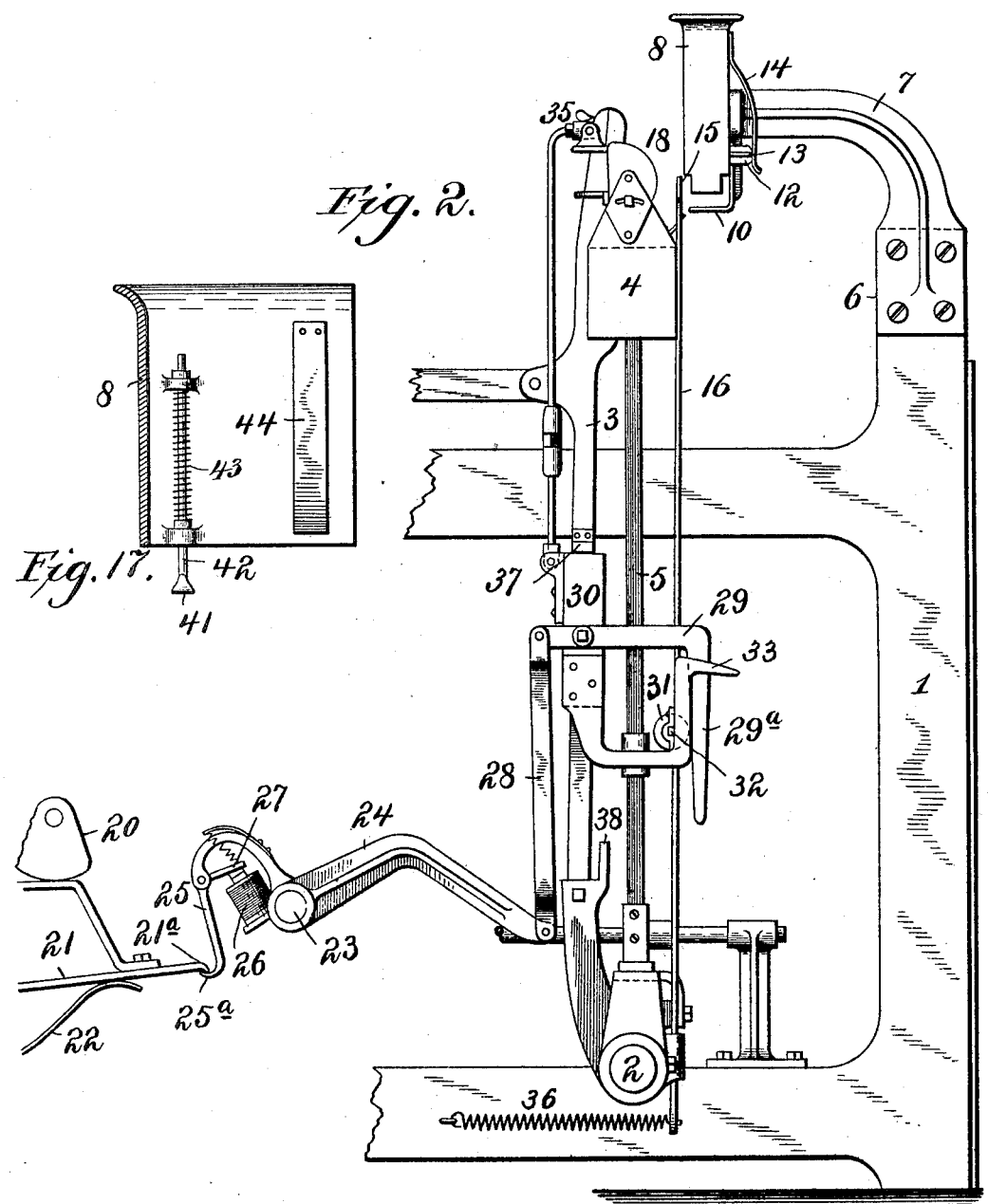

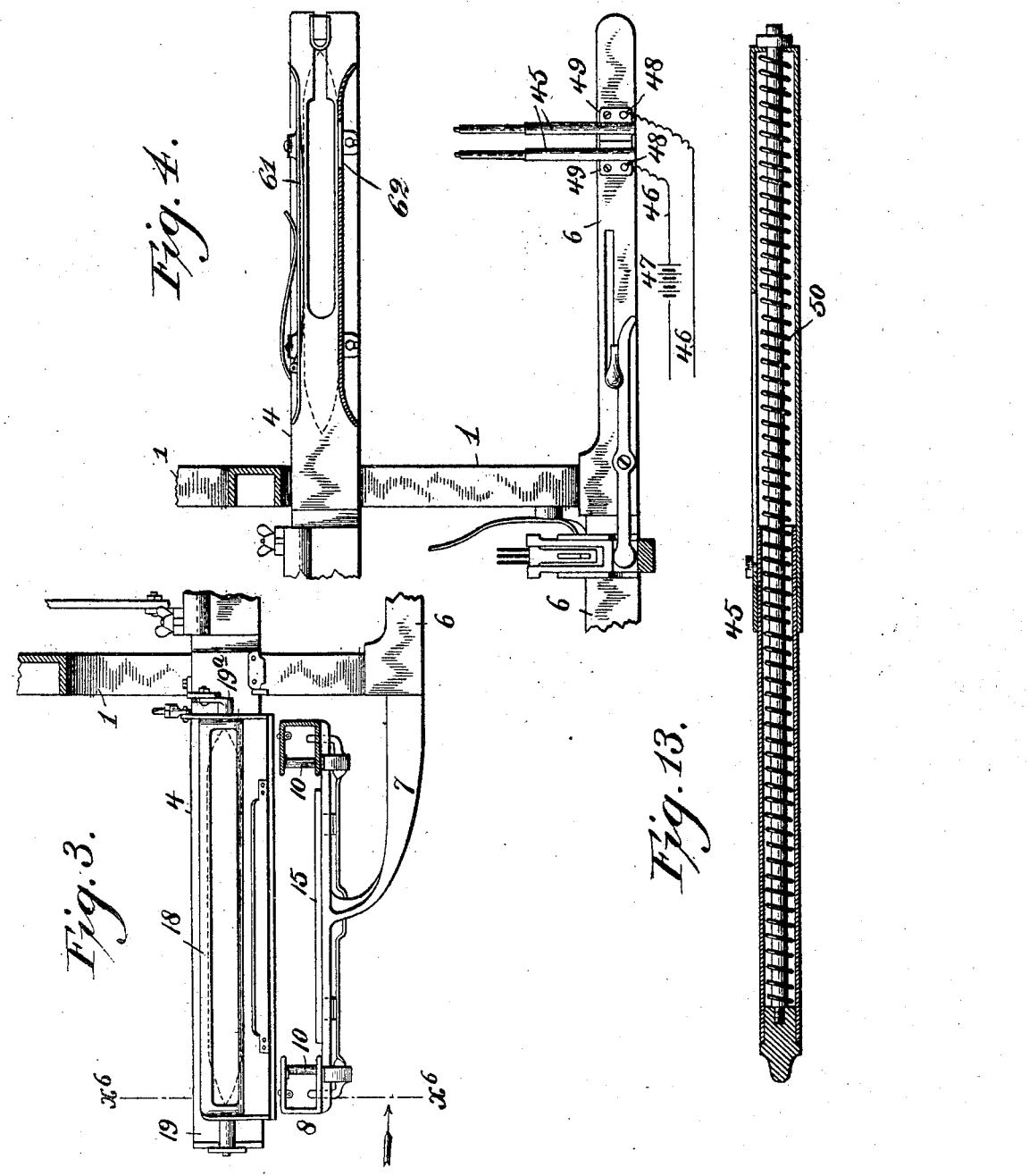

No. 681,647. Patented Aug. 27, 1901.
W. H. BAKER & F. E. KIP.
WEFT REPLENISHING AND CONTROLLING MECHANISM FOR LOOMS.
(Application filed June 12, 1901.)
(No Model.) 7 Sheets—Sheet 4.
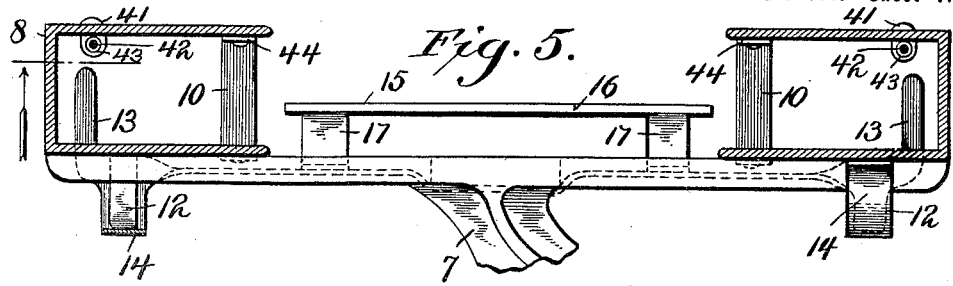
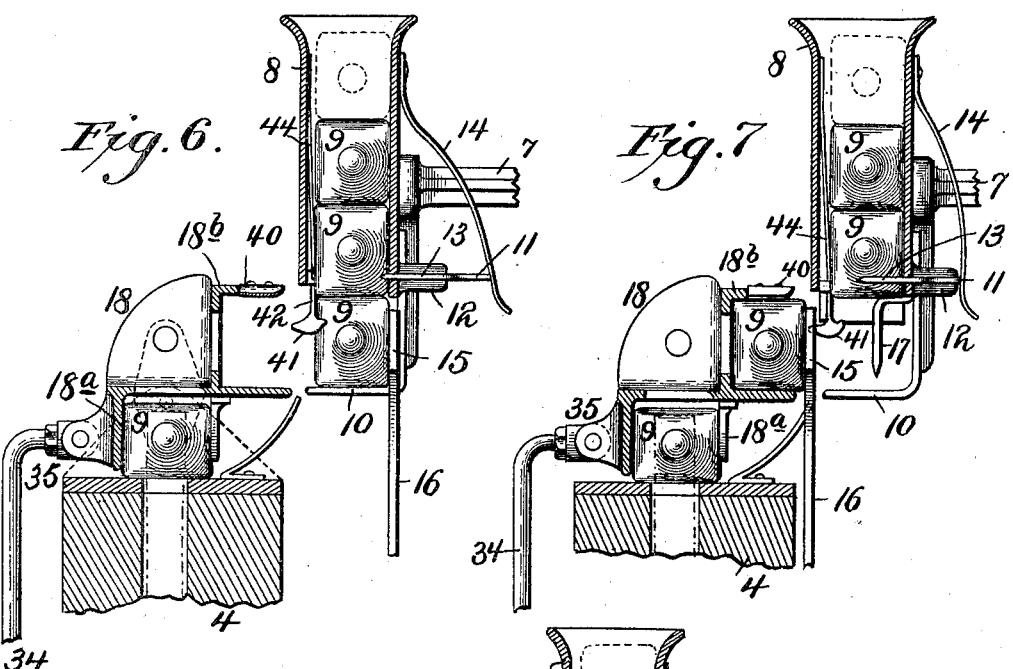
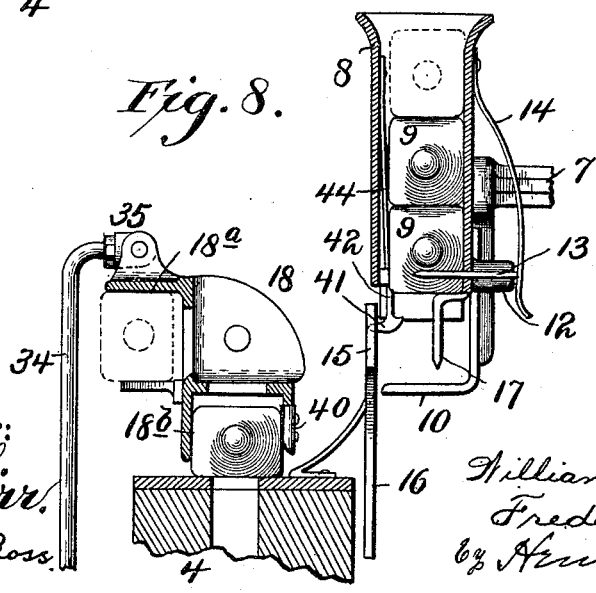
Witnesses:
J. B. McGirr.
Peter A. Ross.
Inventors
William H. Baker
Frederic E. Kip
by Henry Connett
Attorney

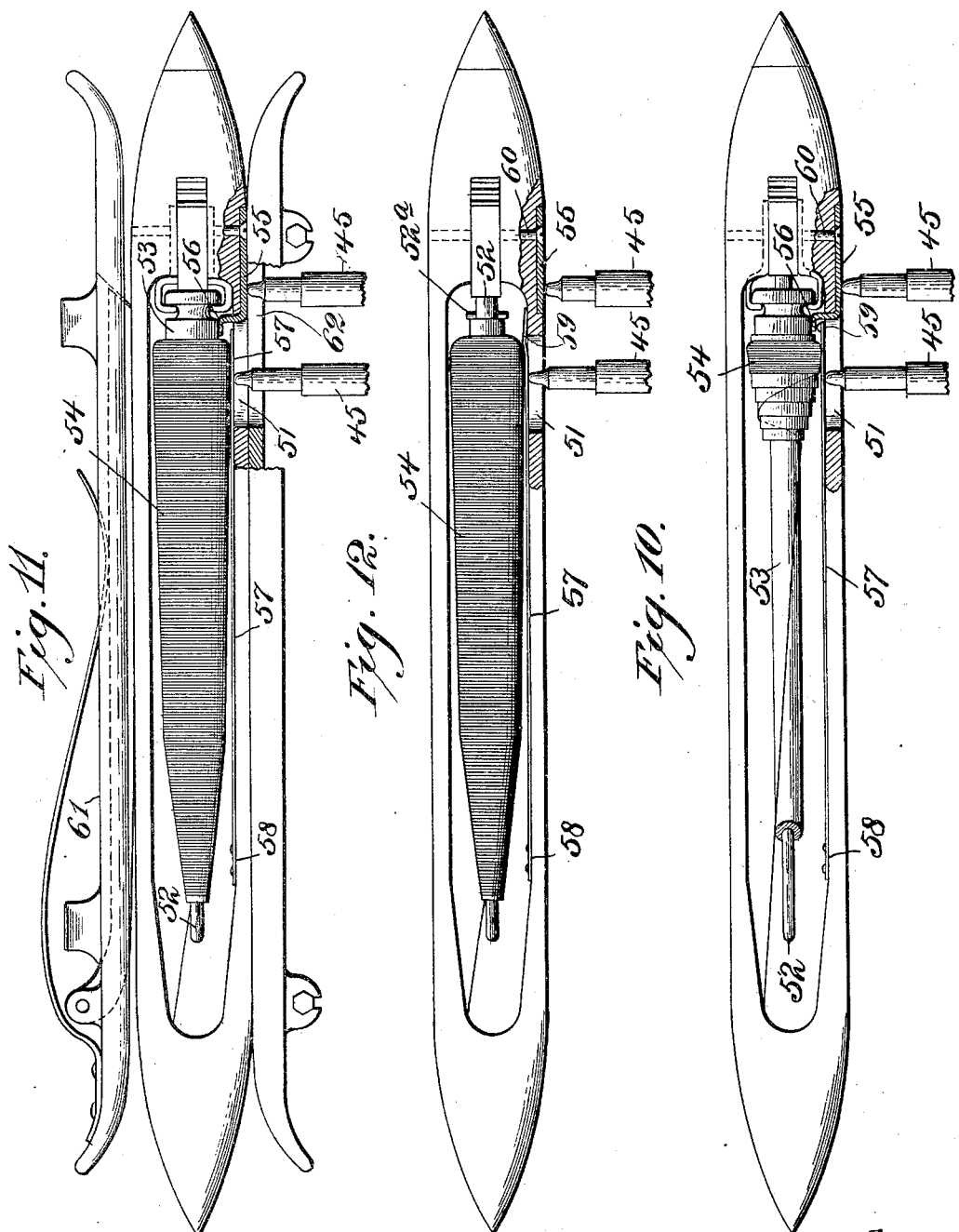

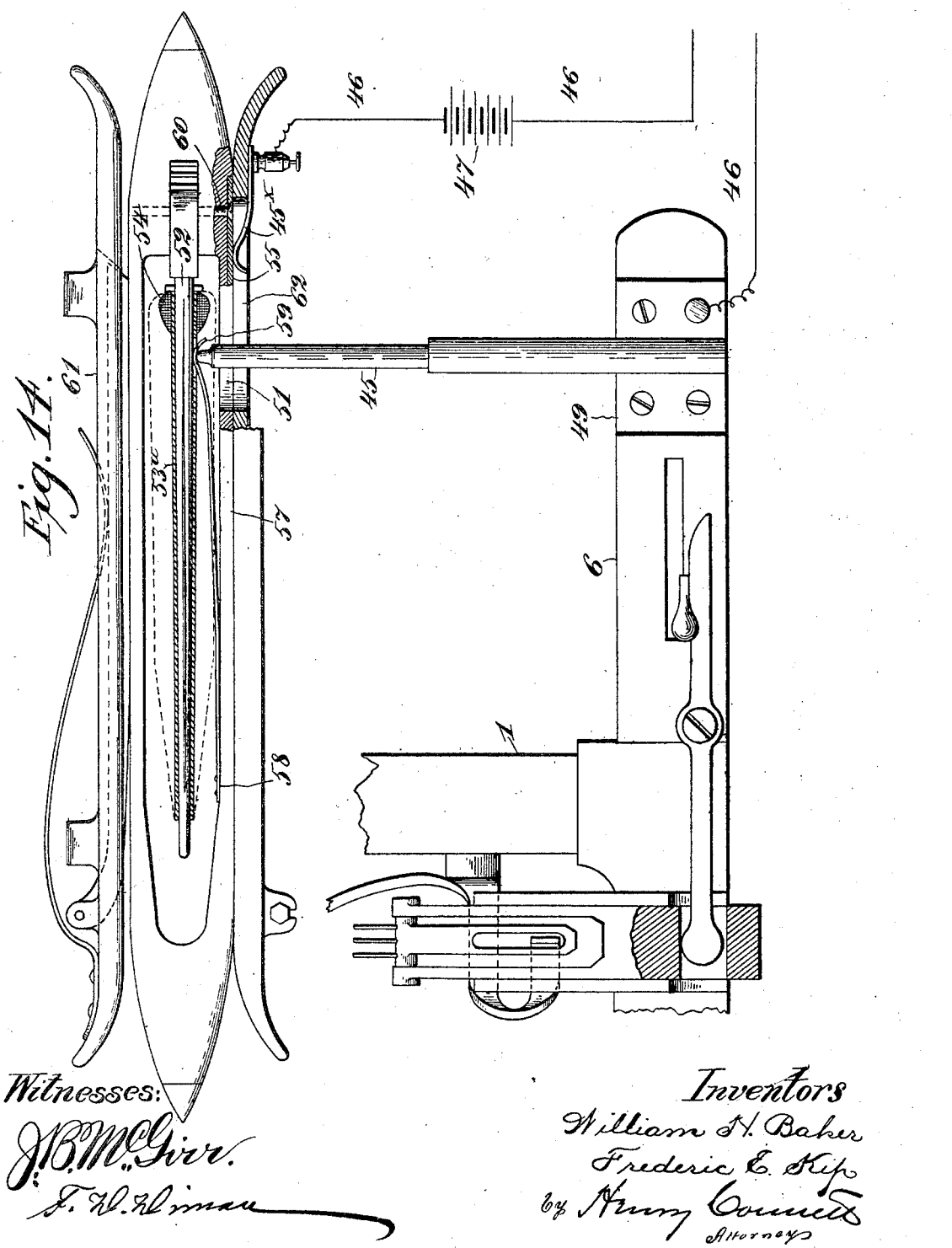

No. 681,647. Patented Aug. 27, 1901.
W. H. BAKER & F. E. KIP.
WEFT REPLENISHING AND CONTROLLING MECHANISM FOR LOOMS.
(Application filed June 12, 1901.)
(No Model.) 7 Sheets—Sheet 7.
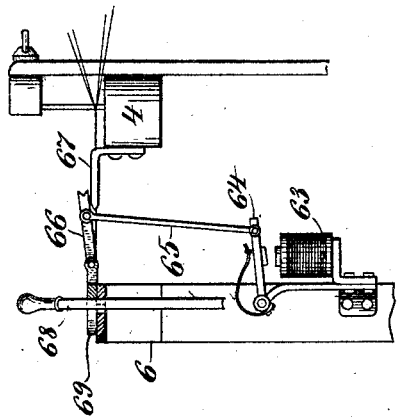
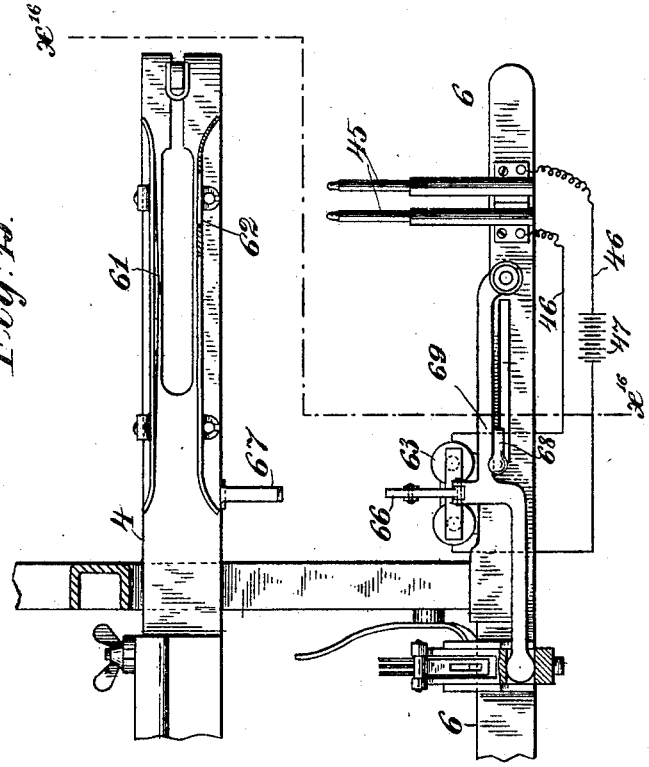
WITNESSES:
INVENTORS:
William H. Baker
Frederic E. Kip
BY
Henry Connett
ATTORNEY

UNITED STATES PATENT OFFICE.

WILLIAM H. BAKER, OF CENTRAL FALLS, RHODE ISLAND, AND FREDERIC E. KIP, OF MONTCLAIR, NEW JERSEY.

WEFT REPLENISHING AND CONTROLLING MECHANISM FOR LOOMS.

SPECIFICATION forming part of Letters Patent No. 681,647, dated August 27, 1901.

Application filed June 12, 1901. Serial No. 64,246. (No model.)

*To all whom it may concern:*

Be it known that we, WILLIAM H. BAKER, residing at Central Falls, Providence county, Rhode Island, and FREDERIC E. KIP, residing at Montclair, Essex county, New Jersey, citizens of the United States, have invented certain new and useful Improvements in Weft Replenishing and Controlling Mechanism for Looms, of which the following is a specification.

This invention relates to the class of weft or filling controlling mechanisms for looms of which weft - replenishing mechanisms and weft stop-motions are examples.

In the constructions embodying the present invention the exhaustion of the filling in the running shuttle to a predetermined extent acts to set in motion the weft-controlling mechanism through electromechanical means to either replenish the weft automatically or to stop the loom when the weft requires replenishing.

In the accompanying drawings, which illustrate an embodiment of the invention, Figure 1 is a side elevation of the front part of a loom provided with our improvements, the view showing the left-hand side of the loom with the moving parts in their normal position. Fig. 2 is a similar view showing the parts of the replenishing mechanism in operation. Figs. 3 and 4 are plan views, the former showing the parts of the loom at the side where the magazine is situated and the latter showing the other side, where the contacts are made. Fig. 5 is a horizontal section through the magazine, taken near the top thereof. Figs. 6, 7, and 8 are vertical sectional views of the magazine and shuttle-box at substantially the point indicated by line $x^6$ in Fig. 3 and showing the parts in three different positions. Fig. 9 is a detail view of the placer-arm and the roller thereon on the same scale as Fig. 1. Figs. 10 and 11 are plan views of the shuttle, partly in section, showing the contact devices therein. Fig. 12 is a view of the shuttle, illustrating a slightly-different form of the contact devices. Fig. 13 is a sectional view of one of the terminals of the controlling-circuit. Fig. 14 illustrates a construction embodying the invention, but which differs in some respects from that above described. Fig. 15 is a plan view, and Fig. 16 a sectional elevation at line $x^{16}$ in Fig. 15, illustrating the application of the invention to a weft stop-motion. Fig. 17 is a detail view of the magazine, showing the presser-foot, the plane of the section being indicated by the dotted line and arrow at the left in Fig. 5.

Referring primarily and mainly to Figs. 1 and 2, 1 designates the loom-frame, and 2 the swing-rail or rock-shaft, about which swing the lay-swords 3, which carry the lay 4. 5 is one of the picker-sticks, and 6 is the breast-beams. All of these parts are common on looms in some shape or form.

Mounted on a suitable bracket 7 on the loom-frame or breast-beam is a magazine 8 to hold the spare shuttles 9, as indicated in Figs. 5 and 6. The details of construction of the magazine will be best understood from inspection of Figs. 5, 6, 7, 8, and 17. As the shuttles are superposed in the magazine, resting sidewise one on another, and fall out below, one by one, onto two bracket-supports 10, fixed below the open bottom of the magazine at a distance sufficient for the lowermost shuttle to clear, as seen best in Fig. 6, a segregating device is employed for separating the said lowermost shuttle from that next above it, so that the mass of superposed shuttles will be supported during the replenishing operation. This segregating device comprises a bar 11 back of the magazine and mounted to slide horizontally in guides 12 on the magazine and provided near its respective extremities with fingers 13, which are adapted to advance and take under the respective pointed ends of the shuttle which is next above the segregated shuttle, and thus support the pile of shuttles in the magazine when the segregated shuttle is moved out into the shuttle-box. The bar 11 is backed by yielding springs 14, which tend normally to press the fingers 13 into the shuttle-box to the position seen in Fig. 7. Normally the bar 11 is pressed back to the position seen in Figs. 7 and 8 by the placer or placer-head 15 on the upper end of a placer-arm 16, which at its lower end turns about the swing-rail 2 below the placer 15, impinging on a pendent bracket or brackets 17 on the bar 11.

The shuttle-box 18 has two cells $18^a$ and

18$^b$ and is pivotally mounted at 19 and 19$^a$, Fig. 3, on the lay, so that by oscillation on its pivots either cell thereof may be brought into line with the raceway. The cell 18$^a$ may be called the "normal" working cell and the cell 18$^b$ the "receiving" or "auxiliary" cell. When the lay beats up, the latter cell 18$^b$ is presented with its open bottom to the segregated shuttle 9 to be supplied, as seen in Fig. 6.

The means for actuating the placer-arm 16 for moving the full shuttle into the auxiliary cell 18$^b$ and for rocking the shuttle-box, so as to bring this cell to the raceway, will now be described, premising that a part of this mechanism is very similar to that illustrated in our United States Patent No. 637,753, dated November 21, 1899.

A continuously-rotating cam 20, Figs. 1 and 2, depresses at each of its rotations an operating-lever 21, which is upheld by any form of yielding spring 22. Consequently the lever 21 has imparted to it a regular up-and-down vibratory movement. Mounted to rock on a fulcrum 23 is an intermediate lever 24, one arm of which carries an auxiliary hook-lever 25. An electromagnet 26, carried by the lever 24, is adapted when excited to attract an armature 27, carried by one arm of the hook-lever 25, thus rocking the hook-lever in a manner so as to move its hooked extremity 25$^a$ out into the path of the descending hooked extremity 21$^a$ of the operating-lever 21. When this occurs, the lever 21 rocks the intermediate lever 24 on its fulcrum. The longer arm of the lever 24, which is thus forced upward, is coupled by a link 28 to the shorter arm of a lever 29, which is fulcrumed on a slide 30 on one of the lay-swords 3. By the elevation of the shorter arm of the lever 29 the longer arm of this lever is depressed, and a hook-arm 29$^a$ on its extremity, which takes over a roller 31 on the arm 16, is made to engage said roller and draw the placer 15 and its arm 16 up to the lay, as seen in Fig. 2. The preferred construction and arrangement of these last-mentioned parts is seen in Fig. 9, which is a fragmentary face view of the arm 16, as seen from the left in Fig. 1. The arm 16 has in it a slot 16$^a$, through which extends the hook-arm 29$^a$ and in which is mounted the roller 31. The squared end of the fixed arbor 32, on which the roller turns, projects out laterally from the arm 16. As the hook-arm 29$^a$ draws the placer up to the lay the end of the bar 32 plays over the upper surface of a cam 33, bracketed on and projecting out from the slide 30, and this cam prevents said slide from rising until the said bar passes off the inner end thereof and clears the said cam, at which time the fulcrum of the lever 29 will be changed (see Fig. 2) to the point where the hook-arm 29$^a$ of the lever 29 bears on the roller 31, and the slide 30 will be moved upward. This upward movement of the slide 30 does not begin until the segregated shuttle, Fig. 7, is housed in the receiving-cell 18$^b$, and said slide then acts to rotate the shuttle-box through a rod 34, fixed below to the slide 30 and coupled above to a crank-lug 35 on the shuttle-box. The extent of the rotation of the box as herein shown is ninety degrees. The shuttle is received, of course, while the lay is beat up, Figs. 6 and 7, and on the movement of the lay back to the picking-point the shuttle-box is rotated, Fig. 8. This throws out the exhausted shuttle and brings the fresh shuttle into the proper position to be picked. As soon as it is picked the operating-lever 21 releases the auxiliary lever 25 and the slide 30 falls, thus rotating the shuttle-box 18 back to its original position and releasing the placer 16, which returns to its normal position. (Seen in Fig. 1.) The placer is returned by its spring 36, Figs. 1 and 2, and gravity or a spring may be relied on to bring the slide 30 back to its normal position.

In order to accurately limit the extent of movement of the shuttle-box 18 about its pivots, any form of stop device may be employed. As herein shown, Figs. 1 and 2, there is a block or shoulder 37 on the lay-sword to limit the upward movement of the slide 30 and another stop 38 below to limit its downward movement.

There is a curved guide 39 on the lay to guard against the shuttle falling out of the auxiliary cell 18$^b$ while the box is being rotated to the position seen in Fig. 8. This is merely a precautionary device, as the cell 18$^b$ will have or may have a spring-swell 40 at one side to pinch on or clamp the shuttle slightly.

In order to prevent the segregated shuttle from bouncing up as it passes from the supports 10 into the cell 18$^b$, due to the jarring of the loom and the sudden movement, the following-described precautionary device will be or may be employed.

In the respective ends of the magazine, at the points best indicated in Fig. 5, are spring presser-feet. Each of these devices comprises a foot 41 on an upright stem 42 in eyes or sliding bearings on the magazine-wall, the stem being embraced by a coil-spring 43. As the shuttle is pushed out from the magazine the conical tips of the shuttle wipe under the feet 41, which yield upward elastically. The feet are rounded somewhat, so as to permit the shuttle to pass under them freely. Springs 44 in the magazine keep the pile of shuttles pressed up to one wall thereof. These springs are not deemed essential.

Referring now to Figs. 4, 10, 11, and 13, the circuit-closing devices will be described.

On the breast-beam 6 or a bracketed extension thereof, at the side of the loom opposite to the magazine and situated at the proper point, are mounted two like or similar metallic terminals 45 of the controlling electric circuit, composed of wires or conductors 46 and including a generator 47, Fig. 4, and the electromagnet 26. The conductors are coupled to the respective terminals at binding-posts 48 on insulated metal plates 49, supporting the terminals. Fig. 13 illustrates the construction of the terminals. Each is telescopic, the contact ends thereof being yielding and backed by coil-springs 50. One terminal is seen in section in Fig. 13. The terminals are placed side by side, though separated somewhat, as shown in Fig. 4.

Fig. 11 shows the preferred construction of the shuttle. In the side of the shuttle is an aperture 51, and in the hollow of the shuttle is mounted a hinged spindle 52 to receive a bobbin 53 or other suitable holder for weft or filling 54. The bobbin may be of the usual kind, which is tubular and of wood. On the side of the shuttle is secured a metal plate 55, upon which impinges, when the lay beats up, one of the terminals 45. This plate is bent so as to enter the hollow of the shuttle at the aperture 51 therein, and at its inner extremity is a contact-piece 56. In the shuttle and extending along the inner face of the side thereof is a spring 57, secured to the side of the shuttle at 58 and extending across the aperture 51. The other terminal 45 impinges on this spring when the lay beats up, and if there be weft or filling on the bobbin, as in Fig. 11, of considerable amount the spring 57 will be pressed against this filling and the spring thus held or fended out of contact with the contact-piece 56; but when the weft or filling is nearly exhausted, as seen in Fig. 10, and the lay beats up the contact-pieces 56 and 57 are brought together and the operating and controlling circuit closed through the magnet 26, thus setting the replenishing mechanism in motion. The free or contact end of the spirng 57, Fig. 10, may be modified by bending it laterally or providing it with a protuberance or contact-piece 59, so as to adapt the spring to close the circuit when there is more or less yarn remaining on the bobbin or weft-holder.

Fig. 12 illustrates a slightly-different construction from that seen in Figs. 10 and 11. In this construction the weft-holder is a cop, and the free end of the spring 57 is adapted to form a contact with the metal spindle or with a pin 52ª therein, the spindle being electrically connected with the plate 55 through some metal part of the shuttle—as the pivot pin or screw 60 of the spindle, for example.

It will be noted that the contact is effected and the circuit closed before the bobbin or weft-holder is entirely denuded, as indicated in Fig. 10.

The shuttle-box 61 (seen in Figs. 4 and 11) will have an aperture or way 62 in its side coincident with the way or aperture 51 in the shuttle to afford access to the spring circuit-closer 57 by the proper terminal 45.

Fig. 14 illustrates a construction where one of the yielding terminals 45 is omitted. In this construction the omitted terminal is substituted by a spring 45ˣ on the shuttle-box, which makes contact with the plate 55 whenever the shuttle enters the box, thus putting the metal spindle 52 in the circuit. When the yarn on the cop-tube 53ª is sufficiently exhausted, the terminal 45 impinges on the intermediate contact-spring 57 and presses its contact end 59 against the spindle 52 through an aperture in the cop-tube, thus closing the controlling-circuit.

The United States Patent to Chace, No. 633,976, dated September 26, 1899, shows various devices and ways for changing the circuit—viz., circuit-changing devices carried by the shuttle and contacting with contact-points on the shuttle-box, also the terminal of the circuit sustained wholly exterior to the shuttle and contacting directly with circuit-closing means on the bobbin or weft-holder, also the terminal sustained exterior to the shuttle and passing through an aperture in the front of the shuttle-box and shuttle, these circuit-changing means being used to actuate either mechanism to automatically supply a loom with weft or filling previous to the entire exhaustion of said weft or filling or to stop the loom on the breakage of the filling-yarn or its exhaustion to a predetermined degree. It will be noted, however, that in all these various ways the circuit-changing means is always mounted on the bobbin or weft-holder itself. Our present device mounts the circuit-changing means on the shuttle itself, which does away entirely with the expense of putting this circuit-changing means on the thousands of necessary bobbins or weft-holders. We therefore consider same as an important part of this invention, and as we are the first, as we believe, to supply in a shuttle circuit-changing means that are exterior to the weft or filling, in combination with terminals of an electric circuit sustained exterior to the shuttle, we therefore intend to claim same in its broad sense without reference to special means for accomplishing the result.

In our United States Patent No. 637,695, dated November 21, 1899, we show a suspended shuttle-box which or a portion of which is vibrated laterally. Our present shuttle-box is also suspended on the lay and has a rocking movement, but instead of the one-celled shuttle-box it has two cells. We wish it understood that this two-celled shuttle-box is not at all limited to electric controlling devices, but that mechanical or any known form of control devices can be used in lieu of electric controlling devices.

We believe we are the first to produce a two-celled or multiple-celled shuttle-box on the lay, a portion of which is adapted to rock or oscillate, and we therefore intend to claim same broadly. We also wish it understood that we may employ the exhaustion-indicating devices we have described and claimed in connection with a suitable stop-motion for a loom—as, for example, that illustrated in Figs. 15 and 16. In these views an electromagnet 63, mounted on the loom, is in the same circuit with the generator and feeler terminals. The armature-lever 64 of the magnet is coupled by a rod 65 with a dagger 66, hinged to the knock-off lever 69, whereby when the circuit is closed through the magnet the dagger 66 is put into the path of a bunter 67 on the lay and the impingement of this bunter on the dagger acts through the knock-off lever to set free the shipper-lever 68 and stop the loom. This knock-off device, including the magnet, the dagger, the knock-off lever, and the shipper-lever are old *per se* and are merely shown herein for illustration. Our invention is not, of course, limited specifically to this knock-off device, as any other known device for the purpose of stopping the loom may be used as well in connection with our exhaust-indicating means.

By "exhaustion," "absence," or "denudation" as referring to the condition of the weft or filling in the shuttle we mean such a degree thereof as will permit the circuit-changing means to operate while there is still sufficient filling in the shuttle to prevent an imperfection in the cloth being woven.

We have shown the controlling-circuit as normally open and as operating when closed; but it will be obvious to any electrician in the present state of the electrical art how the circuit might be normally closed and be broken at the terminal-feelers when the weft or filling shall have been exhausted to a predetermined extent.

Having thus described our invention, we claim—

1. In a loom, weft-replenishing means, an electric circuit controlling said replenishing means and having its terminals sustained exterior to the shuttle, and a shuttle having mounted on it contact devices in the paths of the respective circuit-terminals and exterior to the weft or filling in the shuttle, said terminals closing said circuit upon the exhaustion of the filling in the shuttle to a predetermined extent.

2. In a loom, an electric circuit containing an electromagnet and having a plurality of terminals exterior to the shuttle, and a shuttle provided with circuit-closing means exterior to the weft or filling in the shuttle, and adapted to engage said terminals periodically when the loom is in operation.

3. In a loom, a shuttle-box and shuttle each having an aperture or way in its side for the entry of operating means when the shuttle is in the box, the said shuttle, provided with circuit-closing means situated exterior to the weft or filling in the shuttle, and an electric circuit including a generator and electromagnet and having yielding terminals sustained exterior to the shuttle and adapted, in the operation of the loom, to pass through said apertures in the shuttle and box and operate said circuit-closing means.

4. In a loom, the combination with an electric circuit including a generator and electromagnet, a terminal of said circuit constituting a feeler, and a shuttle provided with a contact-piece located exterior to the weft or filling in the shuttle, and a movable circuit-closer also exterior to the weft or filling and in the path of said feeler, and adapted to be put thereby into contact with said contact-piece when the filling in the shuttle is exhausted to a predetermined extent to thereby complete said circuit.

5. In a loom, an electrically-controlled weft-replenishing means, a terminal of the controlling-circuit thereof constituting a feeler, in combination with a shuttle having mounted on it an electric contact-piece exterior to the weft or filling in the shuttle, a movable circuit-closer mounted on the shuttle exterior to the weft or filling therein and in the path of said feeler, and adapted to be put by the latter into contact with said contact-piece when the filling is exhausted to a predermined extent, and means for putting said contact-piece in the controlling-circuit when the shuttle is in the shuttle-box.

6. In a loom, the combination with an electric circuit including a generator and electromagnet the terminals of which constitute feelers, of a shuttle provided, exterior to the weft or filling in the shuttle, with circuit-closing devices in paths of the respective feelers, said circuit-closing devices being mounted on the shuttle and one element thereof being held, normally, out of electrical contact with the other by the said weft or filling.

7. In a loom, electrically-controlled weft-replenishing means, the terminals of its controlling-circuit constituting feelers, in combination with a shuttle having mounted on it, exterior to the weft or filling therein, circuit-closing devices in the respective paths of said feelers, one element of said circuit-closing devices being held normally out of electrical contact with the other by the said weft or filling.

8. In a loom, the combination with an electric circuit, including a generator and electromagnet, the terminals of said circuit constituting feelers, and a shuttle provided with contact devices for completing said circuit when acted upon by said feelers, said contact devices being mounted on the shuttle itself and controlled as to their action in completing the circuit by the weft or filling in the shuttle.

9. In a loom, an electrically-controlled weft-replenishing mechanism, the terminals of its circuit constituting yielding feelers, in combination with a shuttle provided with a metal plate 55, in the path of one of said feelers, said plate having a contact part 56, and a spring circuit-closer 57 in the path of the other feeler and adapted to be pressed into electrical contact with the part 56 when the weft or filling in the shuttle is exhausted to a predetermined extent.

10. In a loom, an electrically-controlled weft-replenishing mechanism, the terminals of its controlling-circuit constituting feelers, in combination with a shuttle provided with contact devices for completing said circuit when acted upon by said feelers, said contact devices being both mounted on the shuttle itself and the operation in closing the circuit controlled by the weft or filling in the shuttle.

11. In a loom, a weft-replenishing mechanism having a two-celled shuttle-box mounted to oscillate for bringing either cell of the box to the raceway for picking the shuttle therefrom, a magazine to contain spare shuttles, and a vibrating placer coöperating with said box for supplying full shuttles periodically to the latter.

12. In a loom, a weft-replenishing mechanism comprising electrical controlling means for determining the degree of exhaustion of the weft, mechanical operating means, a two-celled, oscillating shuttle-box for receiving and carrying a full shuttle to the raceway for picking, a magazine for spare shuttles, and means for transferring a shuttle from said magazine to the receiving-cell of the box.

13. In a loom, a weft-replenishing mechanism having an oscillating, two-celled shuttle-box, a magazine to contain spare shuttles and having a bottom delivery, a segregating device, a support below the magazine to receive the segregated shuttle, transferring means for placing the segregated shuttle in the box, mechanical operating means, and electrical controlling means for determining the periods of operation of the replenishing mechanism.

14. In a loom, weft-replenishing means, an electric circuit containing an electromagnet and having a plurality of terminals exterior to the shuttle, and a shuttle provided with circuit-changing means exterior to the weft or filling in the shuttle, a portion of said means being periodically engaged by said terminals, and made inoperative by the presence and operative by the substantial absence of weft in the active shuttle to thereby actuate said replenishing means.

15. In a loom, the combination with an electric circuit including a generator and an electromagnet, a terminal of said circuit constituting a feeler, of a shuttle having circuit-changing means sustained in the shuttle exterior of the weft or filling therein, said shuttle also having an aperture for the entry of said feeler, and a yieldingly-sustained conductor or circuit-closing piece which extends lengthwise of the shuttle across said aperture, the free end of said circuit-closer being directed toward the butt-end of the bobbin or weft-holder in the shuttle.

16. In a loom, the combination of a weft-replenishing mechanism, an electric circuit including a generator and electromagnet, a terminal of said circuit constituting a feeler of a shuttle having circuit-changing means sustained in the shuttle exterior of the weft or filling therein; said shuttle also having an aperture for the entry of said feeler and a yieldingly-sustained conductor or circuit-closing piece which extends lengthwise of the shuttle across said aperture, the free end of said circuit-closer being directed toward the butt-end of the bobbin or weft-holder in the shuttle.

17. In a loom, the combination with an electric circuit including a generator and magnet, of a shuttle provided with circuit-changing means exterior to the weft or filling therein and also provided with a yieldingly-sustained conductor or circuit-closing piece, means exterior of said shuttle adapted in the operation of the loom to press against said circuit-closing piece, said circuit-closing piece having its free end directed toward the butt-end of the weft-holder, said circuit being held inoperative by the presence and made operative by the substantial absence of the weft or filling in the shuttle.

18. In a loom, an electrically-controlled weft-replenishing mechanism, a circuit having circuit-closing means sustained therein exterior to the weft or filling, said shuttle also having a yieldingly-sustained conductor or circuit-closing piece, means exterior of said shuttle adapted in the operation of the loom to press against said circuit-closing piece, said circuit-closing piece having its free end directed toward the butt-end of the weft-holder, said circuit being held inoperative by the presence and made operative by the substantial absence of the weft or filling in the shuttle.

19. As a new article of manufacture, a shuttle having an aperture or way and a yieldingly-sustained piece which extends lengthwise of the shuttle, and across said aperture or way, the free end of said piece being directed toward that end of the shuttle where the holding devices for the bobbin or filling-holder are situated.

20. As a new article of manufacture, a shuttle having an aperture or way and a yieldingly-sustained piece which extends lengthwise of the shuttle and across said aperture or way, a portion of said metal piece being set out of line laterally with the other portion thereof, and the free end of said piece being directed toward that end of the shuttle where the holding devices for the bobbin or filling-holder are situated.

21. In a loom, an electric circuit, a shuttle-box, a shuttle provided, exterior to the filling therein, with circuit-changing means which forms a part or section of said circuit, the actuating portion or section of said circuit being sustained exterior to and independent of the shuttle, and means for connecting the different sections of the said circuit when the filling or weft in the shuttle is exhausted to a predetermined extent.

22. In a loom, an electric circuit, a shuttle-box, a shuttle provided, exterior to the filling therein, with circuit-changing means, which forms a part or section of said circuit, the actuating portion or section of said circuit being sustained exterior to and independent of the shuttle, and means for connecting the different sections of the said circuit when the filling or weft in the shuttle is exhausted to a predetermined extent, and a weft-replenishing mechanism controlled by said circuit.

In witness whereof we have hereunto signed our names, this 7th day of June, 1901, in the presence of two subscribing witnesses.

WILLIAM H. BAKER.
FREDERIC E. KIP.

Witnesses:
PETER A. ROSS,
E. G. DELANEY.